(12) United States Patent
Nichols

(10) Patent No.: US 7,959,442 B2
(45) Date of Patent: Jun. 14, 2011

(54) MULTI-SENSORY TEACHING KIT AND METHOD

(75) Inventor: Webb Nichols, Watertown, MA (US)

(73) Assignee: Webb Nichols, Watertown, MA (US)

( * ) Notice: Subject to any disclaimer, the term of this patent is extended or adjusted under 35 U.S.C. 154(b) by 719 days.

(21) Appl. No.: 11/950,785

(22) Filed: Dec. 5, 2007

(65) Prior Publication Data

US 2008/0305461 A1 Dec. 11, 2008

Related U.S. Application Data

(60) Provisional application No. 60/874,663, filed on Dec. 13, 2006.

(51) Int. Cl.
*G09B 19/00* (2006.01)
(52) U.S. Cl. .......................................................... 434/127
(58) Field of Classification Search .................. 434/127, 434/236, 245; 426/106, 132; D1/128
See application file for complete search history.

(56) References Cited

U.S. PATENT DOCUMENTS

| | | | |
|---|---|---|---|
| 1,502,006 A | 7/1924 | Alvord | |
| 2,169,226 A | 8/1939 | Cormack | |
| D287,781 S * | 1/1987 | Schmidt | D1/115 |
| 4,696,473 A * | 9/1987 | Wyzykowski | 273/153 R |
| 4,733,863 A * | 3/1988 | Novotny | 273/429 |
| 4,797,291 A | 1/1989 | Pierce et al. | |
| 4,818,233 A | 4/1989 | Behan | |
| 5,071,133 A | 12/1991 | Smith | |
| 5,224,862 A | 7/1993 | Sullivan | |
| 5,295,834 A | 3/1994 | Saunders | |
| 5,303,473 A | 4/1994 | Sadler | |
| 5,407,712 A | 4/1995 | D'Allura | |
| 5,447,584 A * | 9/1995 | Shakespeare et al. | 156/63 |
| 5,620,324 A | 4/1997 | Rettke | |
| 5,731,020 A * | 3/1998 | Russo | 426/104 |
| 6,099,872 A * | 8/2000 | Whetstone, Jr. | 426/90 |
| D440,377 S * | 4/2001 | Keller et al. | D1/120 |
| RE37,362 E * | 9/2001 | D'Andrea | 446/149 |
| 6,525,660 B1 | 2/2003 | Surintrspanont | |
| 6,679,494 B2 * | 1/2004 | Scovel | 273/261 |
| 2004/0213877 A1 | 10/2004 | Badalucca | |
| 2005/0132579 A1 | 6/2005 | Sartori | |

(Continued)

FOREIGN PATENT DOCUMENTS

JP 2001321090 11/2001

OTHER PUBLICATIONS

"LuLu's Vintage Blog Fashion Fridays 2006", Nov. 24, 2006 [retrieved online Aug. 3, 2010].*
Flach, M. "Rosary Makers Needed" Catholic Herald, Oct. 28, 2004 (retrieved Jul. 3, 2008) Retrieved from the Internet. <URL: http://www.catholicherald.com/eddesk/04ed/ed041028.htm> p. 1, para 5.

(Continued)

*Primary Examiner* — Kurt Fernstrom
(74) *Attorney, Agent, or Firm* — Sampson & Associates, P.C.

(57) ABSTRACT

A multi-sensory teaching kit includes one or more edible items in symbolic shapes, a handbook including a glossary of meanings for the shapes, and a spiritual lesson. In some embodiments, a souvenir such as a jewelry bead is provided, with an optional text explaining the significance of the souvenir. A method of production of a multi-sensory teaching kit is provided, comprising, forming a cookie into a symbolic shape, writing a handbook including a glossary of meanings of the symbolic shapes, printing a lesson on a spiritual principle, optionally providing a souvenir, and optionally enclosing the cookie, handbook, lesson, and optional souvenir in a container.

20 Claims, 12 Drawing Sheets

U.S. PATENT DOCUMENTS

| | | |
|---|---|---|
| 2005/0133996 A1 | 6/2005 | Jenkins |
| 2006/0177800 A1 | 8/2006 | Wilkins |
| 2008/0020120 A1* | 1/2008 | O'Donnell Kiely .......... 426/549 |
| 2008/0083641 A1* | 4/2008 | Alm et al. ..................... 206/579 |
| 2008/0108034 A1* | 5/2008 | Tam .............................. 434/322 |

OTHER PUBLICATIONS

"Welcome to Cracker Jack.com.", [online] [retrieved on Dec. 5, 2007] Retrieved from http://www.crackerjack.com/home.htm.

"Barnum's Animals Crackers", [online] [retrieved on Dec. 4, 2007] Retrieved from http://nabiscoworld.com.

* cited by examiner

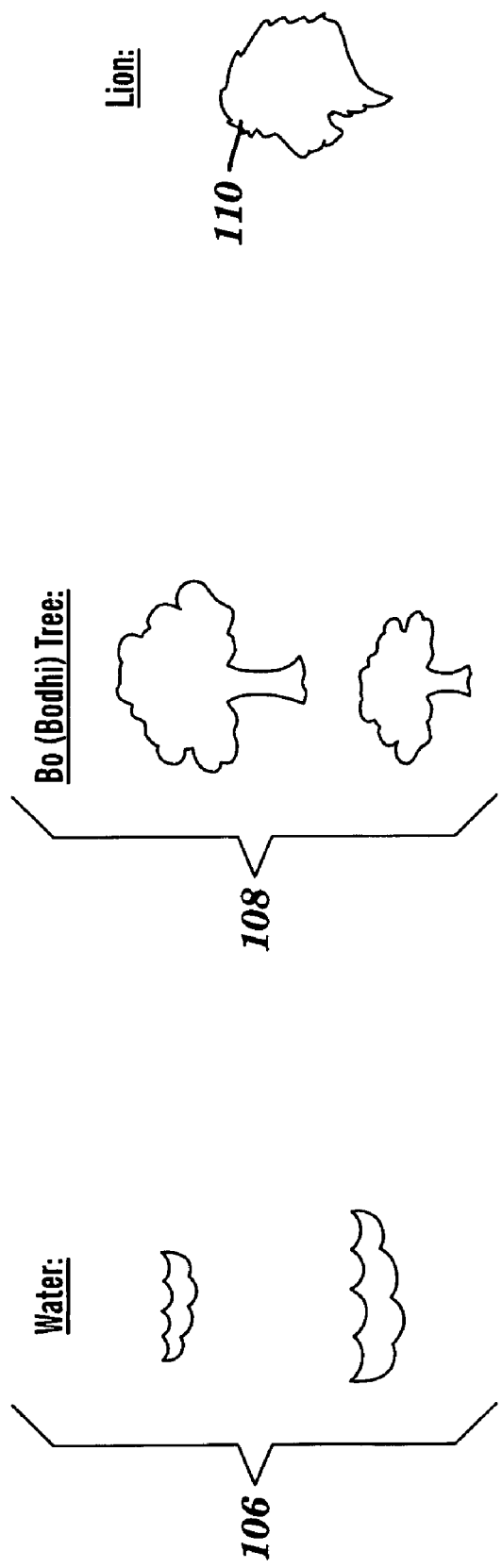

MULTI-SENSORY TEACHING KIT AND METHOD

This application claims priority to U.S. Provisional Patent Application No. 60/874,663 entitled Cookie Kit/Teaching Aid, filed on Dec. 13, 2006.

BACKGROUND

1. Technical Field

This invention relates to a multi-sensory teaching kit and method of production, and more particularly to a teaching kit which appeals to multiple senses of the user, while teaching the meanings of symbols and objects in a diversity of cultural and historical contexts, and a method of production.

2. Background Information

Throughout this application, various publications, patents and published patent applications are referred to by an identifying citation. The disclosures of the publications, patents and published patent applications referenced in this application are hereby incorporated by reference into the present disclosure.

Educational tools, such as teaching kits, are well known in the art. Such teaching kits, including kits for teaching spiritual values, typically rely on visual cues such as game boards and cards.

For example, Smith, U.S. Pat. No. 5,071,133, discloses a "Board Game for Teaching Biblical Principles," including a game board with instructional text. Sullivan, U.S. Pat. No. 5,224,862, also discloses a game board, and a plurality of question cards relating to a particular subject matter. Saunders, U.S. Pat. No. 5,295,834, similarly discloses a game board and question and answer cards. Behan, U.S. Pat. No. 4,818,233, discloses model figures and objects representing a Roman Catholic religious service.

A drawback to these educational tools is that they do not stimulate additional senses of the user, such as the user's sense of taste and smell. Another drawback to such tools is that they are limited to a single religious tradition, and do not educate the user on spirituality in a diversity of cultural and historical contexts.

Thus, a need exists for an educational tool or kit, which draws together common spiritual themes from a diversity of spiritual traditions from around the world, and which engages the user by appealing to the user on a multi-sensory level, such as the user's sense of taste, touch, and smell, while stimulating the user's intellect.

SUMMARY

An aspect of this invention involves a multi-sensory teaching kit, including at least one edible cookie in a symbolic shape, a handbook with a glossary of meanings of the symbolic shape, and a written lesson.

Another aspect of this invention involves a multi-sensory teaching kit, including a plurality of edible cookies, wherein each cookie of the plurality is in a symbolic shape, and a handbook. The handbook includes a glossary of meanings of each symbolic shape, and instructions for ceremonial consumption of a cookie. The kit also includes a souvenir, an optional text explaining a significance of the souvenir, and a written lesson.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 4A-4L are plan views of examples of an aspect of the embodiments of FIGS. 1 and 2;

DETAILED DESCRIPTION

Figure 1:
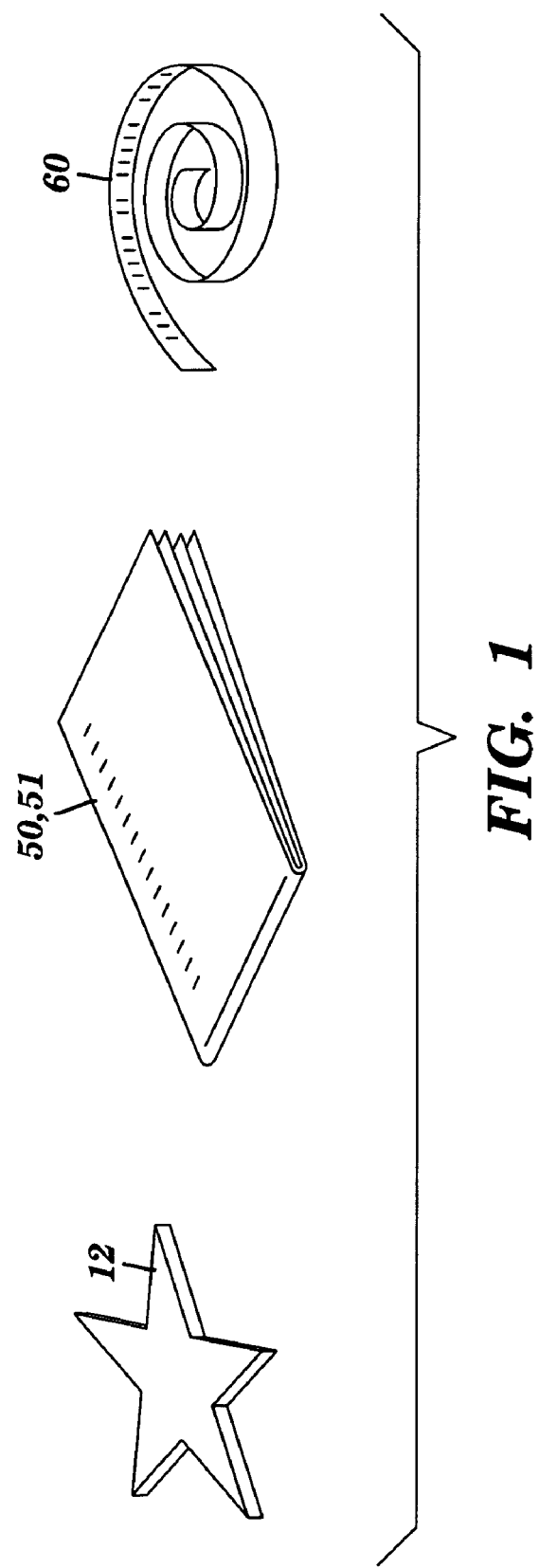
FIG. 1 is a perspective view of an embodiment of the invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Where used in this disclosure, the term "cookie" when used in connection with an element described herein refers to any edible item, and the term "handbook" refers to printed material.

In order to learn about the significance of symbols in a multiplicity of cultures, it is beneficial to a user to have an interactive learning experience. Ideally, the user should be able to handle and interact with the symbols, while learning of their meanings in a multiplicity of disciplines. Multiple senses of the user should be stimulated, such as the user's sense of taste, smell, and touch. The learning experience may be made to feel significant to the user by providing guidance for a ceremonial consumption of the edible symbol. The significance of the learning experience to the user may also be enhanced by providing a souvenir of the learning experience, with optional text explaining the significance of the souvenir in a diversity of cultural traditions.

Briefly, each of the elements of the kit contributes to a multi-sensory, ceremonial learning experience for the user. An edible item, such as a cookie, is in a symbolic shape. The symbolic shape may have spiritual significance in a diversity of cultural traditions. A handbook includes a glossary of meanings of the symbolic shapes. A short written lesson, such as a spiritual proverb, is also provided. In some embodiments, a souvenir is included, with optional text explaining the meaning of the souvenir. The user's sense of taste, smell and touch are stimulated by the cookies, and the user is also enlightened by the lesson.

Advantageously, the user is provided with a multi-sensory, interactive experience, in which the user is able to learn about the significance of symbols in a multiplicity of cultures.

In some embodiments, a souvenir of the experience is provided. The souvenir may be made from a material of cultural significance, such as incense or a bead formed from a semi-precious stone. The souvenir may be from a culture in which the symbolic shapes of the edible cookies have spiritual significance. Optional text may explain the cultural significance of the material from which the souvenir is formed.

The souvenir, such as incense, may help to create a ceremonial atmosphere for the consumption of the cookie. The souvenir beads may serve as a reminder of the learning experience after the cookies have been consumed. A souvenir bead may also be assembled with beads from other kits to form a jewelry item, and the optional text may include instructions for assembly of the beads into the jewelry item. This encourages the user to purchase additional kits and to keep the beads as keepsakes of the individual lessons learned from each kit.

Figure 2:
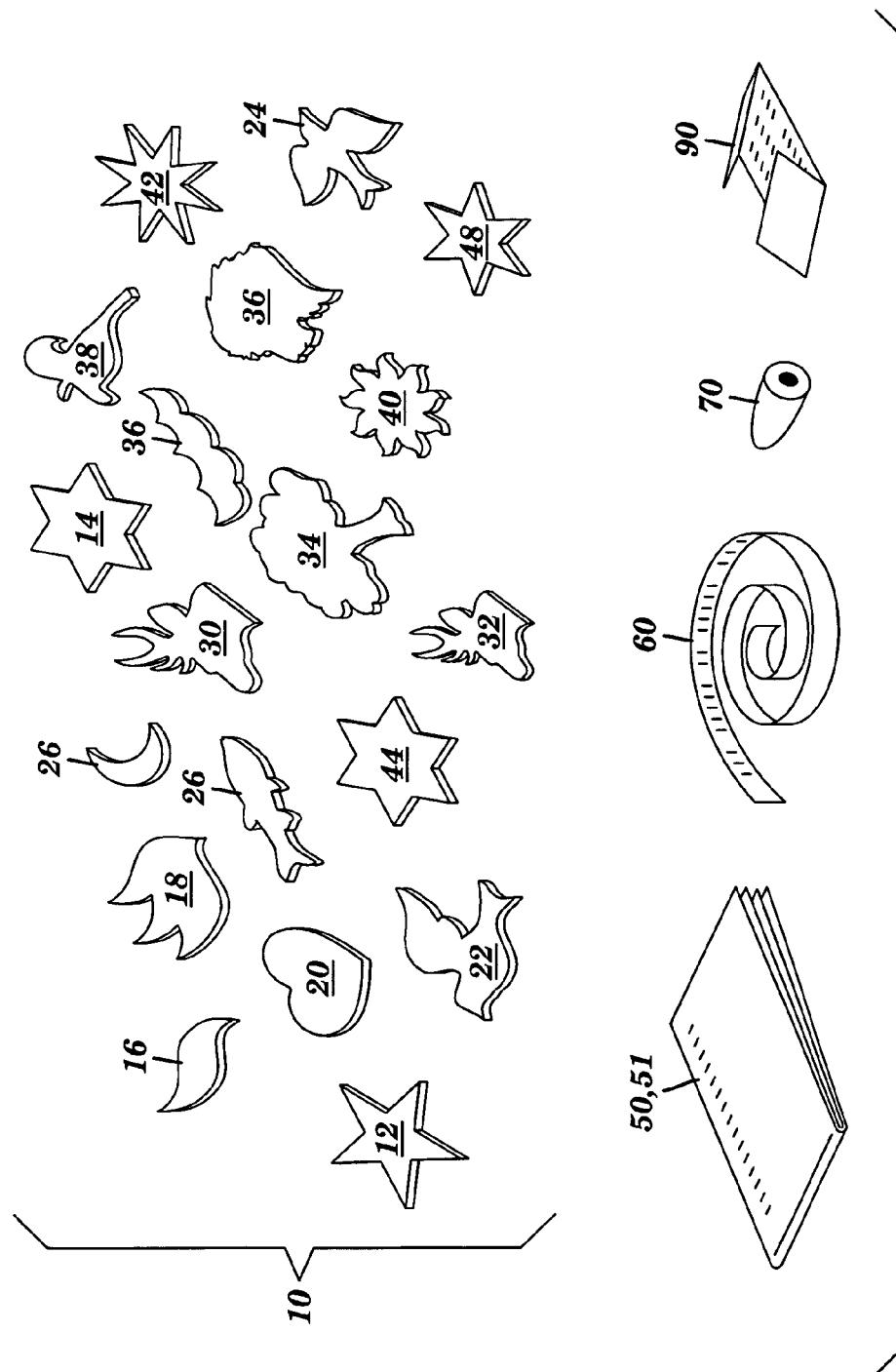
FIG. 2 is a perspective view of an alternate embodiment of the invention.

Referring now to the Figures, various aspects and embodiments of the present invention will be described in detail. Turning to FIG. 1, an embodiment of the present invention includes a cookie 10 in a symbolic shape. For example, the cookie may be in the shape of a five point star 12, or another symbolic shape, as shown in the embodiment of FIG. 2. The embodiment of FIG. 1 also includes a user handbook 50, with a glossary 51 on the meanings of the shapes in a diversity of spiritual, psychological, and cultural contexts.

Figure 3:
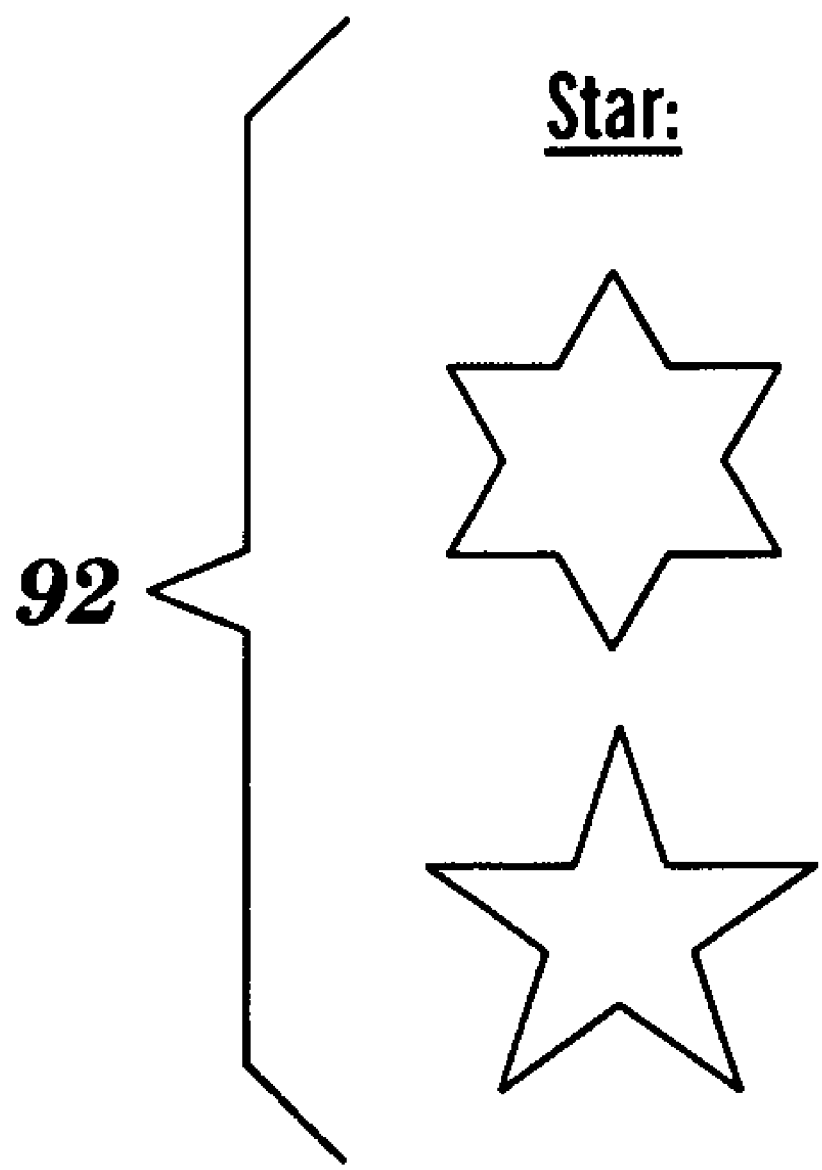
FIG. 3 is a plan view of an example of an aspect of the embodiments of FIGS. 1 and 2.

The user, upon consuming the cookie 12, may consult the glossary 51 to ascertain the symbolic meaning of the cookie in the shape of a five point star 12. Turning to FIG. 3, an example of a glossary entry 92 from handbook 50 explains various cultural and religious meanings of the five point star shape of cookie 12. The following is an example of suitable text for glossary entry 92. In this sample text, the meaning of the star is explained in contexts ranging from Christianity to freemasonry.

> Stars are considered symbols of cosmic order because of the regularity of their movement. In many mythic traditions the stars are understood as resulting from metamorphoses of those who have died. In Christian iconography the presence of stars indicated heavenly occurrences. The Virgin Mary was often depicted surrounded by a halo in the form of a star-studded crown. The Star of Bethlehem signified the birthplace of Christ. The six-pointed star, a hexagram, today called the Star of David is a symbol found in a wide array of cultures around the world. Composed of two overlapping triangles, watery female pointing downward and fiery male pointing upward, representing together a closed harmonically ordered duality. The Biblical King Solomon, son of David, was said to have exorcised demons and summoned angels with it. Cosmological speculation sees the star as a symbol of totality representing fire, water, air and earth. The five-pointed star is considered a favorable symbol representing the light of spirit in Freemasonry and is seen on the US flag.

In this example, the user is able to learn the meaning of this symbol in a variety of contexts, allowing a broadening and multi-dimensional learning experience.

Figure 5:
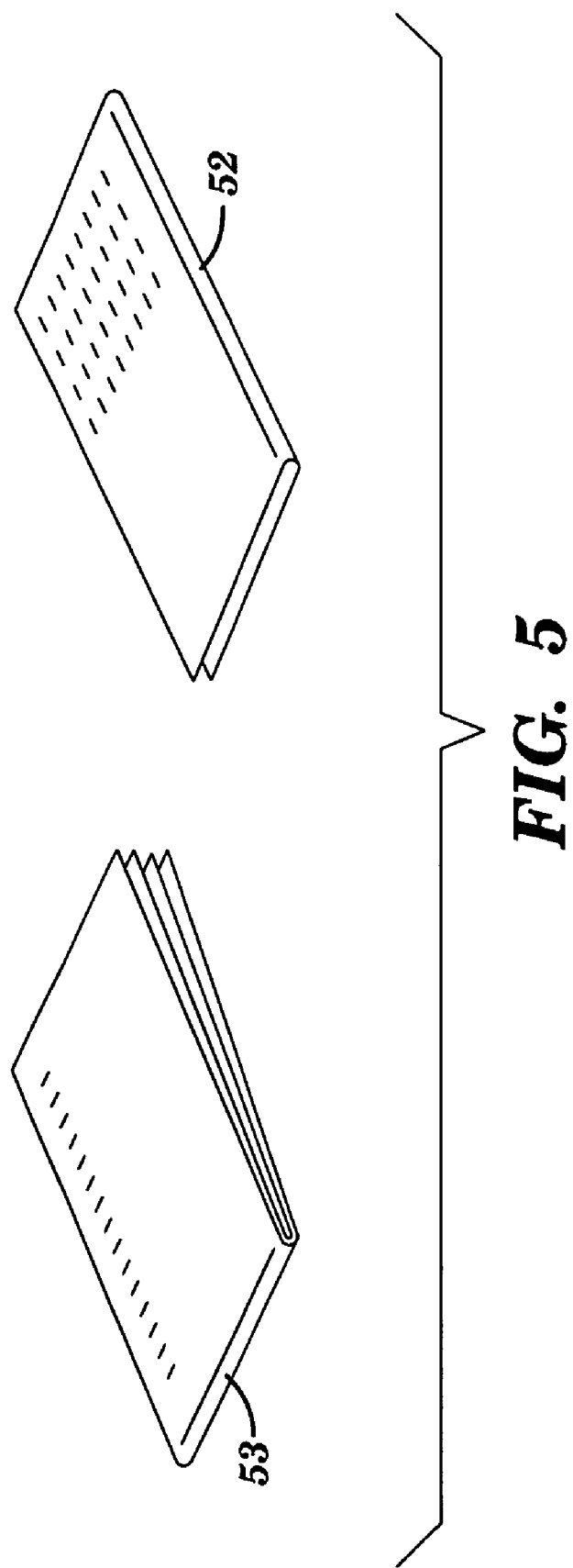
FIG. 5 is a perspective view of examples of an aspect of the embodiments of FIGS. 1 and 2.
Figure 7:
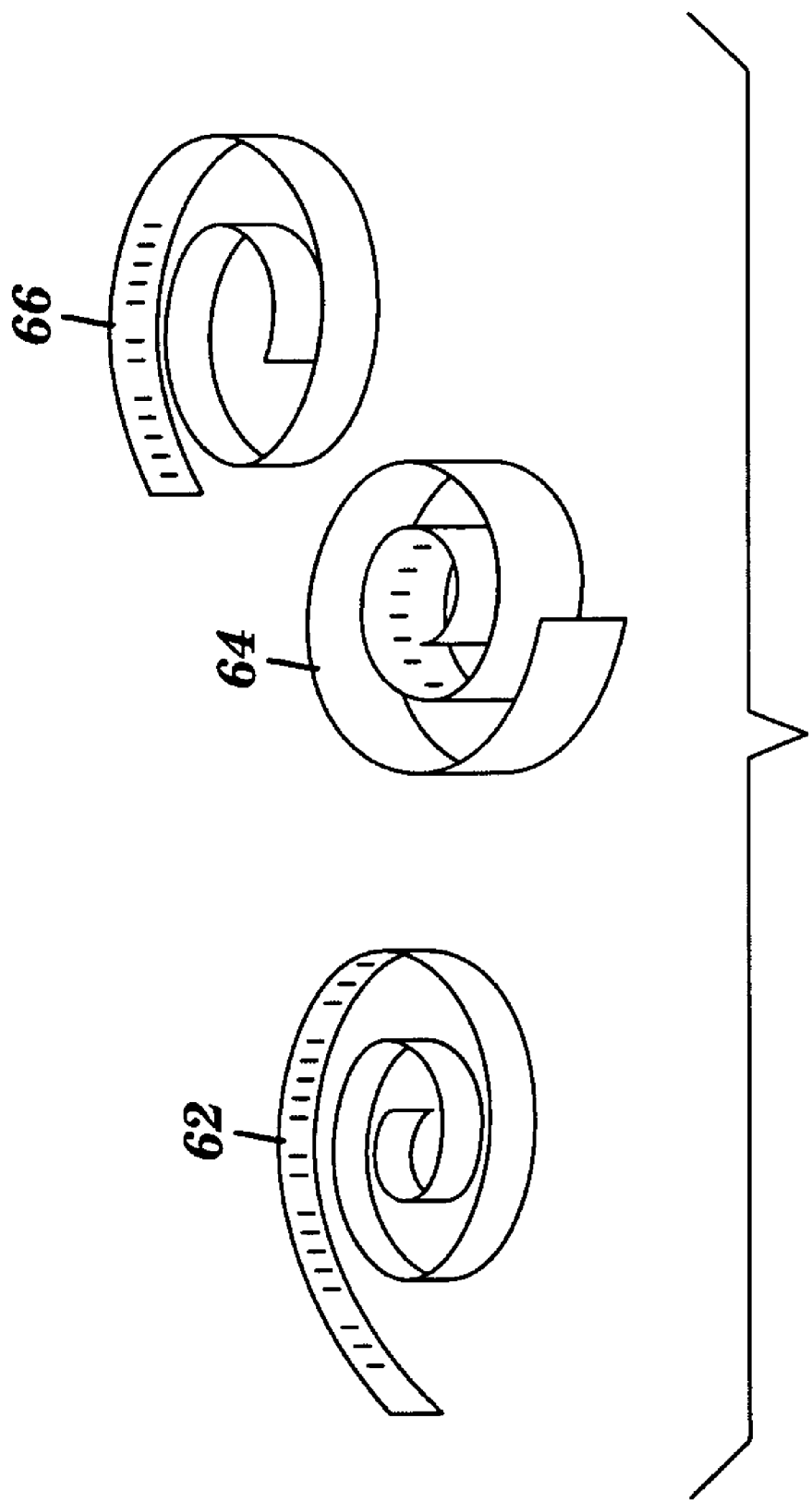
FIG. 7 is a perspective view of examples of an aspect of the embodiments of FIGS. 1 and 2.

The embodiment of FIG. 1 also includes a spiritual lesson 60. An example of such a lesson is "A Cookie Thought: When one cannot control their world, one becomes angry. Life laughs loudly." Set in the context of the multi-cultural meanings of the cookie 10, lesson 60 is a spiritual thought that may be pondered by the user while consuming the cookie 10. Examples of materials which may be used for printed lesson 60 are provided in FIG. 7, including a paper strip with text 62, a ribbon with text 64, and a plastic strip with text 66. The handbook 50 may take any convenient form, such as printed paper. Examples of handbooks 50 are provided in FIG. 5, such as a set of printed sheets of loose leaf paper 52, and a printed pamphlet 53.

Although the cookie shown in the embodiment of FIG. 1 is in the shape of a five point star 12, many shapes of spiritual significance may be used. In the embodiment of FIG. 2, a plurality of cookies 10, in a multiplicity of significant shapes, are provided, as well as a handbook 50 and a spiritual lesson 60, such as the above described exemplary lesson. Examples of the symbolic shapes provided in the embodiment of FIG. 2 include the above described five point star 12, six point star 14, flame 16, fire 18, heart 20, dove 22, dove in flight 24, fish 26, moon 28, deer 30, doe 32, water 36, Bodhi Tree 34, lion 36, sun 40, pointed sun 42, six petal lotus 48, flower 44, and lily 46.

The user, upon choosing a cookie from the plurality 10, may look up the meaning of the symbolic shape of the cookie in the glossary 51 of handbook 50. Glossary 51 explains the meanings of the symbolic shapes in a diversity of cultural traditions. Optionally, a picture of the shape may be provided with the corresponding glossary entry. In the above discussed example of glossary entry 92 of FIG. 3, the meanings of the five point star 12 and a six point star 14 are explained in a multiplicity of cultural, spiritual, and religious contexts.

Additional examples of glossary entries are provided in FIGS. 4A-4L. Glossary entry 94 of FIG. 4A explains meanings of the flame cookie 16, and fire cookie 18, of the embodiment of FIG. 2, in a variety of contexts. The following is an example of suitable text for glossary entry 94. In this sample text, fire is described as "the origin, in many ways, of civilization," but is also described as ambiguous, being both enabling and protective, and also destructive. The sample text also mentions the significance of fire in Christianity and Judaism.

> Fire, the source of light, the origin, in many ways, of civilization is considered perhaps the most powerful and potent purifying force. Fire frees the spirit or soul, burns away impurities, and reduces matter to its essentials. However, fire is ambiguous in its meaning. Fire is both the flame of life tamed over the course of civilization by man, enabling and protecting us with its magical powers, but fire can also represent the destructive anger and force of the Gods. Candles, lamps, and fires are lit in many rituals of many cultures. The sacred light, just by its existence, banishes the dark, the realm of the shadows, the unknown. Fire, "the Son of the Sun," is considered a "male" element and an image of vital force, potency, enlightenment, and the Sun. In some cultures, fire is considered a God, the giver of life; in Judaism, fire was both a means of sacrifice but also the means by which God communicated to his people; in addition, in Christianity, fire represents the Holy Spirit and candles represent both the presence and light of God and of Christ but also a symbol of sacrifice and the love of God by those who light them.

The variety of meanings of fire provided by this example of entry 94 allows the user to reflect on the different aspects of fire, while consuming the flame cookie 16 or the fire cookie 18.

Figure 4C:
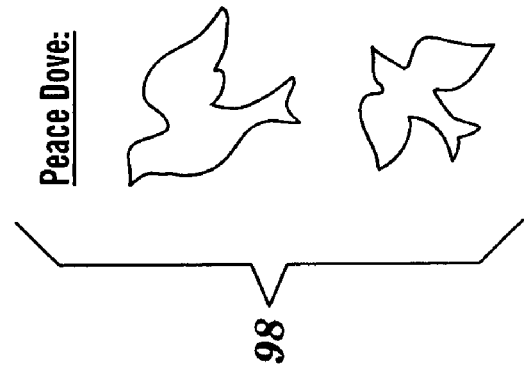
Figure 4B:
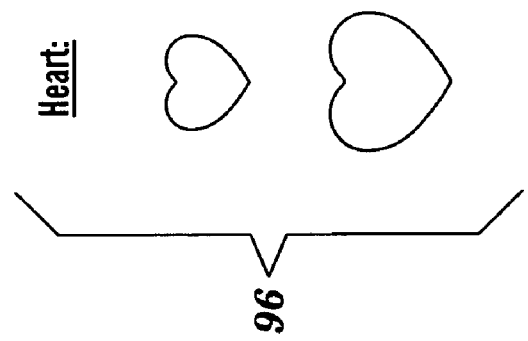
Figure 4A:
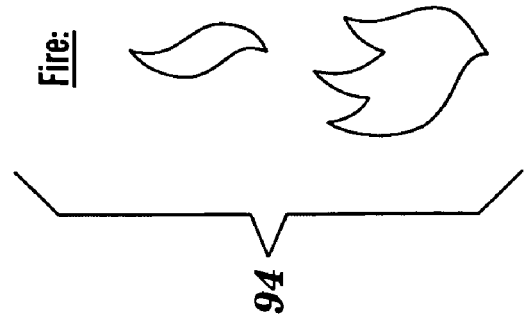

Various meanings of the heart cookie 20 of the embodiment of FIG. 2 are explained in the example of a glossary entry 96 of FIG. 4B. The following is an example of suitable text for entry 46. This sample text provides a broad range of meanings of the heart, including meanings from ancient civilizations and from the Middle Ages, and from Catholicism to Tarot.

In ancient civilizations, the heart was regarded as the center of intellect and intuition. It was also believed that dreams came from the heart as the heart and the Spirit were often intertwined. In the Middle Ages, the heart became associated with love and in modern times with feelings. The human heart is considered a symbol of the mystery of man and in Catholicism, the Heart of Christ as the symbol of his three fold love (divine love, spiritual love, and that of the senses). The heart is considered a symbol of the whole person from which all the rest opens out as the center of the soul and the body. The heart represents the warmth of Spring and summer seasons and the power of light. The heart is considered the center of life and the world. In the Tarot hearts symbolize knowledge, love, life from water and fertility, and in fortune telling, joy.

This sample text allows the user to consider the various aspects of the heart symbol while consuming the heart cookie 20.

Meanings of the dove 22 and dove in flight 24 are explained in the glossary entry 98 of FIG. 4C. The following is an example of suitable text for entry 98. This sample text explains the importance of the dove symbol in a wide range of contexts, including, Semitic, Greek, Indian, Chinese, and biblical references.

The Dove's reputed peaceful, gentle character (bearing little resemblance to its actual behavior) make it a symbol of love and tenderness. Doves were associated with the love goddess Astarte in Semitric tradition and later taken over by the Greeks in the 4th Century B.C. as creatures sacred to Aphrodite and associated with her lover Adonis and with Cupid thus becoming a symbol of romantic love. In the Bible the dove symbolized the end of the Great Flood. The dove is almost always portrayed as a symbol of the Holy Spirit as shown in paintings and on grave markers. The dove is the symbol for the soul of India. In China, the dove stood for marital fidelity and longevity and also fertility as doves multiply so readily. The user may draw on these various traditions to ascribe meanings to the dove 22 and dove in flight 24 cookies.

Figure 4D:
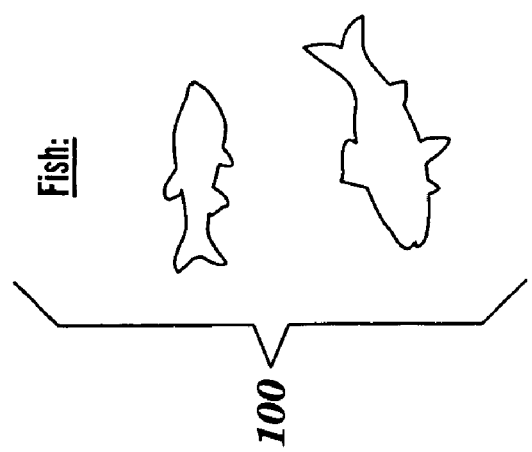

Meanings of the fish 26 of the embodiment of FIG. 2 are provided by the example of a glossary entry 100 of FIG. 4D. The following is an example of suitable text for entry 100. This sample text includes meanings of the fish 26 in Indian, Buddhist, and Christian traditions, and in psychology.

In India the Golden fish were originally symbolic of the rivers Ganges and Yamuna, but came to represent good fortune in general. In Buddhism, they symbolize the auspiciousness of all living beings who practice Dharma remaining in a state of fearlessness without danger of drowning in the ocean of sufferings and can migrate (choose rebirth) from place to place freely and spontaneously, just as fish swim freely without fear through water. In many cultures the fish is a symbol of good luck and happiness. The fish is also a symbol of Christ, and Holy Communion. Varieties of fish were considered divine and sacred since they were understood to inhabit water, the symbol of the unconscious, and embody material from the depths of one's personality.

Figure 4E:
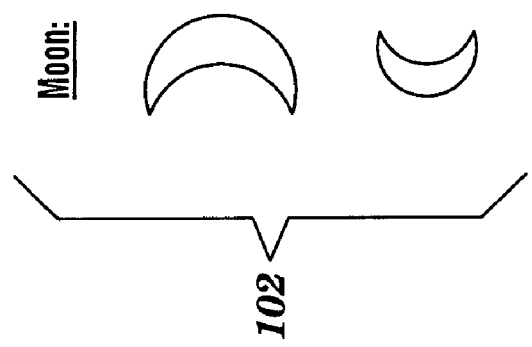

Meanings of the moon symbol 28, of the embodiment of FIG. 2, are provided in the glossary entry 102 of FIG. 4E. The following is an example of suitable text for entry 102. This sample text describes meanings of the moon 28 in a variety of contexts, including on coats of arms and astrology, as well as Christian and Jewish traditions.

The moon is symbolically the most important heavenly body next the Sun. The moon is usually thought of as "female" primarily because of its passivity as the receiver of the sun's light, and the similarity of the lunar month and the menstrual cycle. In Christian iconography, the Virgin Mary, Mother of God, is often likened to the moon. In the Jewish world, the moon is linked with all things nocturnal or otherworldly but also, as in other traditions, femininity and fertility. As dualistic pairs, the Moon is often seen as a symbol of humanity with the sun a symbol of God. In astrology the moon is considered a planet and is seen as fickle producing transitory effects (because of its phases) but also as benevolent and feminine. On coats of arms the moon symbolizes growth and prosperity.

Figure 4F:
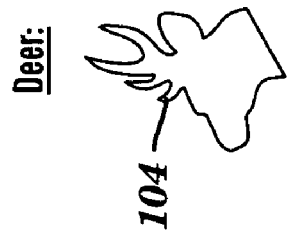

Meanings of the deer 30 and doe 32 of the embodiment of FIG. 2 are provided in the glossary entry example 104 of FIG. 4F. The following is an example of suitable text for entry 104. This sample text provides meanings of deer in Buddhist, Celtic mythological, Pawnee, Chinese, and Shaman traditions.

Deer are a direct reference to the Buddha's first teaching in the Deer Park, Sarnath, also called Dharmachakra Privartan. So wondrous was the Buddha's appearance and peaceful his presence that even the animals came to listen. In Celtic mythology the Deer is a magical creature able to move between worlds and is a symbol of transformation, rejuvenation, and rebirth. To the Pawnee, the deer is a guide to the light of the sun. In China the deer symbolizes immortality and nobility. In Shamanism, the deer is associated with gentleness, caring love, sensitivity, graceful beauty, innocence and keen observation. It is believed deer can show one how to be kind, gentle and patient with other people, teaching people how to love unconditionally by loving what is and not what one wishes to be, even in another person or in one self.

Meanings of the water 36 of the embodiment of FIG. 2 are provided in the example of glossary entry 106 in FIG. 4G. The following is an example of suitable example of text for entry 106. This sample text provides examples of meanings of the water symbol in Buddhism, mythology, psychology, and Christianity.

In Buddhism water symbolizes auspiciousness and purification. In the myths of the creation of the world, water is the primordial fluid from which all life comes. Water is the symbol for the deeper layers of the psyche, and the Afterlife. In Christian contexts, water is generally the cleansing element that washes away sin. It is believed ritually consecrated water can bring divine blessings unifying the cleansing and fertilizing properties of water. In analytical psychology, water is the fundamental symbol of all the energy of the unconscious—an energy (like water) that can be dangerous when it overflows its proper limits.

Meanings of the Bodhi Tree 34 of the embodiment of FIG. 2 are provided in entry 108 of FIG. 4H. The following is an example of suitable text for entry 108. This sample text provides factual information about the Bodhi Tree, as well as its historical importance in Buddhism.

The Bodhi tree is sacred to Hindus and Buddhists. It is under this tree that it is believed Buddha achieved enlightenment. More than 2500 years ago, after wandering the countryside for six years in search of the truth about life, the young prince Siddartha Gautama came to rest in a forest beside the Naranjara River not far from the modern day city of Bodhgaya. Sensing a break-through, he sat down that evening under what has become to be known as the Bo Tree (short for Bodhi or enlightenment), vowing not to arise until he understood the nature of genuine freedom. Throughout the night he was besieged by the forces of Mara or illusion seeking to break his concentration and will in the guises of lust, anger, fear, craving, and doubt. As the night went on, Siddartha's meditation deepened and he began to understand the nature of suffering, the cause of suffering, freedom from suffering, and the path to the end of suffering. While the Bo Tree rained red blossoms that full-mooned night in May, as the morning star glittered in the transparent eastern sky, the great awakening had arrived. Gautama was gone. He had earned the title of Buddha meaning "The Enlightened One." The Bo Tree, or "Pipal" fig tree, the tree of enlightenment, is a large deciduous tree, 75 to 95 feet high. Its hanging leaves rustle in the slightest breeze, and all parts of the tree, roots, bark, leaf, and fruit, are useful. It bears red blossoms in February and purple figs in May/June.

Figure 4J:
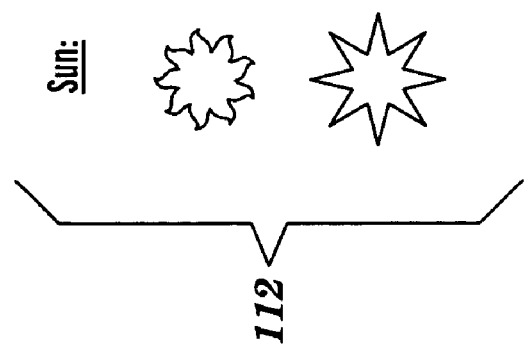
Figure 4K:
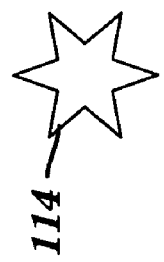
Figure 4L:
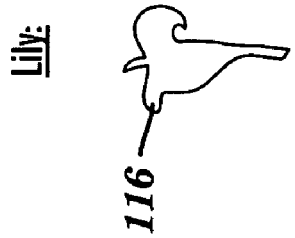

Meanings of the lion 36 of the embodiment of FIG. 2 are explained in glossary entry 110 of FIG. 4L. The following is an example of suitable text for entry 110. This sample text explains the lion's significance in Buddhism.

> The Lion is one of Buddhism's most potent symbols. Traditionally, the lion is associated with regality strength and power. Buddha's teachings are sometimes referred to as the 'Lion's Roar.' It is believed that Buddha, upon freeing himself from all mental afflictions that cause suffering, let out the roar of a lion upon attaining his liberation.

Meanings of the sun 40 and pointed sun 42 of the embodiment of FIG. 2 are provided in glossary entry 112 in FIG. 4J. The following is an example of suitable text for entry 112. This sample text provides meanings of the sun in Babylonian, Christian, Incan, and astrological traditions.

> The Sun, the "Daytime star" symbolizes the masculine and was first associated with a sky god who in ancient Babylonia 'illuminated darkness, lighted the heavens, and annihilated evil above and below.' In Christian iconography the sun, rising over and over again in the east, symbolizes immortality and resurrection. Christ is also associated with the sun since he is also triumphant over time. In Peru, the sun is believed to be the divine ancestor of the Inca nation. In astrology the sun is considered one of the planets. The sun is associated symbolically with kings, paternal authority, worldly status, fame, victory, life force, and force of will.

Meanings of the six petal lotus 48 of the embodiment of FIG. 2 are provided by glossary entry 114 of FIG. 4k. The following is an example of suitable text for entry 114, and is also an example of suitable text for flower 44 of the embodiment of FIG. 2. This sample text provides meanings of the lotus in India and in Buddhism.

> The six petal lotus is the most important symbol of spirituality and art in India. It is a symbol of both knowledge and compassion and signifying complete purification of the body, speech, and mind, and the full blossoming of wholesome deeds in blissful liberation. In the myth of the creation of the world, the Devine creator arose from its calyx. In meditation the lotus is visualized as the heart of Buddha and from it comes a light whose unending rays emanate and soothe the suffering of all creatures.

Meanings of the lily 46 of the embodiment of FIG. 2 are provided in glossary entry 116 of FIG. 4L. The following is an example of suitable text for entry 116. This sample text provides meanings of the lily in ancient cultures, heraldry, and Christianity.

> The lily symbolizes purity, chastity, and innocence. The Angel Gabriel is often painted presenting Mary with a white lily when he announced to her that she would give birth to the Son of God. Before its symbolic meaning, The Lily was held in great esteem and a favorite motif in ancient cultures. In heraldry, lilies are royal flowers because of their scepter like form, ability to scare off snakes, and stimulate the heart.

The handbook 50 of the embodiments of FIGS. 1 and 2 optionally provides information on the cookies. In some embodiments, the recipe for the cookies may be adapted from recipes for traditional ceremonial foods. Instructions are provided in handbook 50. The following is an example of suitable text for these instructions. This sample text informs the user that the cookies are adapted from a Tibetan recipe used to make Kapseh and Sanga Paley for ritual celebrations and festivals, and also describes the organic, superior quality ingredients of the cookies, including water, whole wheat flour, sugar, butter, baking powder, kosher salt, cinnamon, nutmeg, and powdered sugar. The sample text also provides practical information regarding storage and reheating of the cookies.

> You have received a box of Omnium Prayer and Peace Cookies® Third Baking. The Third Baking has the following ingredients for your health and safety:
> Water Kosher Salt
> Whole Wheat Flour Cinnamon
> Sugar Nutmeg
> Butter Powdered Sugar
> Baking Powder
> Omnium Prayer and Peace Cookies are adapted from an ancient Tibetan recipe used to make Kapseh and Sanga Paley for ritual celebrations and festivals. Store the cookies in airtight containers at room temperature between layers of wax or parchment paper. Warm cookies 10-15 minutes at 250 F to restore freshness if necessary. Each cookie has been hand cut from cookie cutters custom shaped and made by Omnium workmen and elves to sacred dimensions and embodies the following symbolism and meanings. Two more cookies have been added. Can you find them?

In some embodiments, the handbook 50 may also provide instructions for ritual use of the cookie as part of the overall spiritual education of the user. The instructions may link the consumption of the cookie with the user's spiritual fulfillment. For example, the instructions may contain the following text.

> As you chew and dissolve a cookie in your mouth, experience first hand the impermanent, transformative, and ever changing nature of life. Recapture that which is permanent and lies deep within oneself, one's good heart, one's innocence and love, and one's connection to all that surrounds one. Experience joy and contentment by reaching out to those in your life who need your forgiveness and love and also to those you feel need some extra love right now. In just imagining that person or persons, know that by the magic of truth and one's connectedness, they will receive the love you are now sending. Just open one's heart as you visualize them and know that they have been touched. Omnium deeply appreciates your use of our products. May they bring you satisfaction and insight.

By following these sample instructions, the user is able to further integrate the cookie into the educational aspect of the kit.

The embodiment of FIG. 2 also includes a souvenir 70, optionally encased in a package, such as packet 68. The souvenir 70 may be from a cultural tradition in which the symbolic shapes have spiritual significance, as discussed below. Optional text 90 contains text explaining the significance of the souvenir 70, and may also provide suggestions on how the user may choose to use the souvenir. Optional text 90 may be part of handbook 50, or it may be printed as a separate item.

Figure 6:
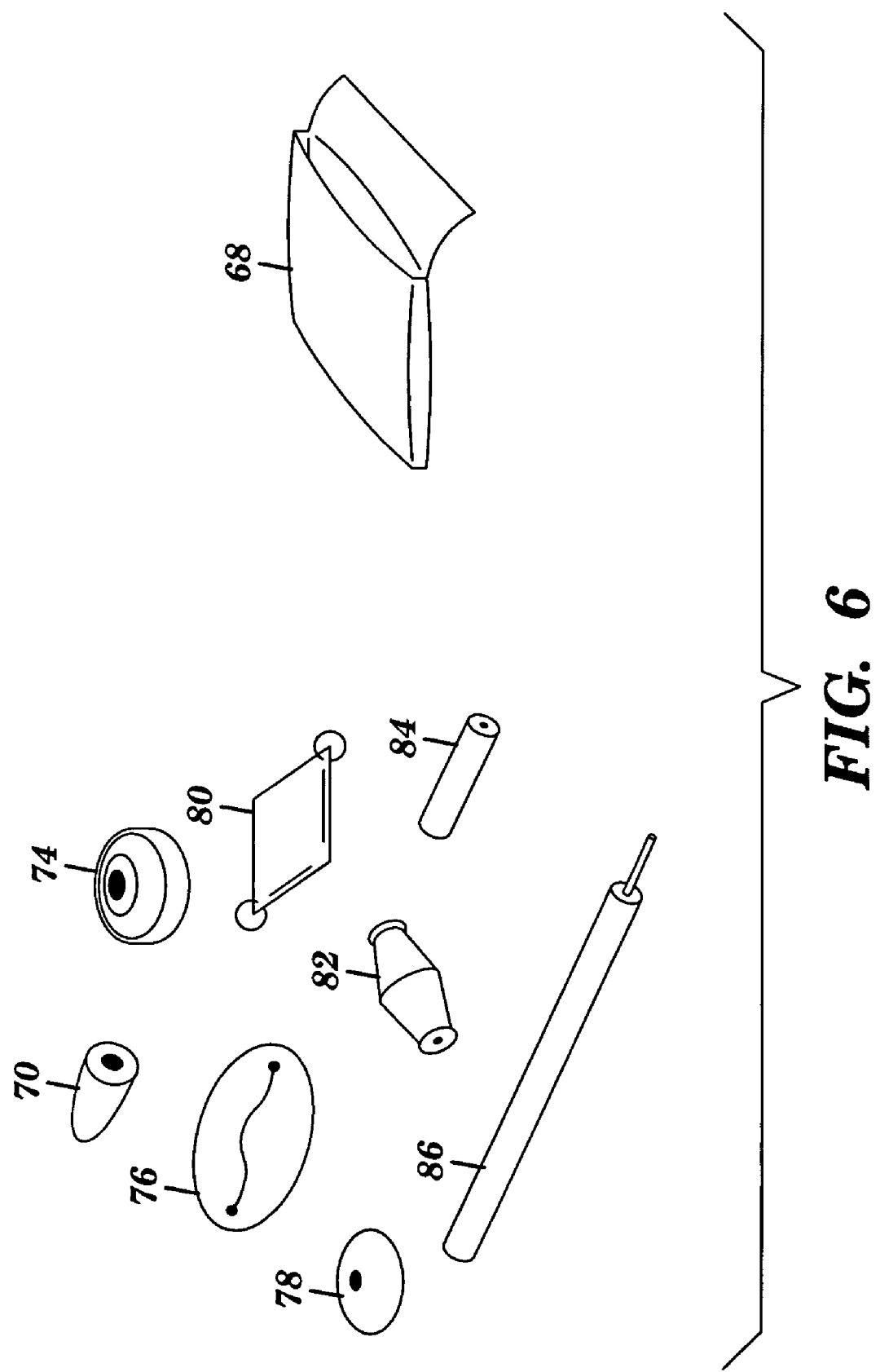
FIG. 6 is a perspective view of examples of an aspect and an optional aspect of the embodiments of FIGS. 1 and 2.

In some embodiments, the souvenir may be made of material which stimulates the user's senses, such as the user's sense of smell. For example, the souvenir 70 may be comprised of incense, which may be used as part of a ceremonial consumption of the cookie. Turning now to the embodiment of FIG. 6, incense 86 is provided as a souvenir. When lit, incense 86 stimulates the sensory experience for the user, and may add to a ceremonial atmosphere. Incense 86 is also significant in a variety of cultures in which the symbolic shapes of edible cookies 10 have special meaning, as described below. Optional text 90 of FIG. 2 may contain text which explains the significance of incense in a wide diversity of cultures, such as cultures of the Middle East, and religious traditions such as Christianity, Buddism, and Taoism, and which also provides suggested uses for the incense, such as giving it as a gift.

> You have received an Omnium Cookie Treasure: Incense is used for many reasons by many religions and systems of belief. In the Middle East incense was burned to ward off evil spirits. Incense was also burned in everyday life, its smoke rising toward the Heavens symbolizing the path of the ascendant soul and one's prayers. Christian worship uses incense in the celebration of the Eucharist and other solemn celebrations. Roman Catholic and Eastern Orthodox faith view the smoke of incense as the sign of a good prayer. In East Asian Buddhist and Chinese Taoist ceremonies and Japanese Shinto shrines, incense is a method of purifying one's surroundings. In Hinduism, incense was used to show loyalty to God in his deity forms such as Krishna and Lord Rama. In Paganism, incense was used in rituals to represent the element of air; today, it represents all the elements as incense is grown from the earth, is formed by the use of water and the smoke is created by fire and wafts through the air. Neopagans and Wiccans use incense to create a magical atmosphere and to release the natural energy stored within the incense. Incense is used for both the purification of a room or other surrounding space and oneself. It is used to foster cleansing and body minded speech and communication to and with the deities and one's ancestors. Keep it for yourself or give it as a loving gift to someone you think might also like to have it. Keep an eye out for Omnium Cookie treasures they hide in all Omnium products.

By reading this sample text, the user learns of the spiritual significance of incense, just as the user learns of the meanings of the symbolic shapes in a diversity of cultures.

In some embodiments, the souvenir 70 may be in the form of a bead. Souvenir beads from different kits may be assembled to form a jewelry item, such as a necklace or bracelet. Examples of souvenir beads may be found in FIG. 6, including semi-precious stone beads 70, 76, such as turquoise, carnelian, red coral, and lapis lazuli. Additional examples of treasure beads include a metal bead 74, a plastic bead 78, a sterling silver bead 80, a glass bead 82, and a wood bead 84.

In some embodiments, optional text 90 may include instructions for assembling a souvenir bead with beads from other kits, to form a jewelry item. For example, the treasure beads may be strung on wire, thread, or string, such as a leather or plastic string. The souvenir beads may have special significance in various cultural traditions, just as the symbolic shapes of the cookies 10 have meanings in various cultures. Examples of written material which may comprise the optional text 90 of FIG. 2 include descriptions explaining the cultural significances of the souvenir beads; explaining the cultural significances of various symbolic shapes of the cookies 10; and providing suggestions on how the user may choose to use each of the souvenir beads, such as wearing it on the user's person, or giving it as a gift.

The following is an example of sample text describing the significance of a semi-precious stone souvenir bead, made of turquoise. This sample text explains significances and perceived benefits of turquoise in the Tibetan cultural tradition.

> You have received an Omnium Cookie Treasure: Turquoise is a healing stone and a favorite stone of the Tibetans. It is thought to help one start new projects, warn the wearer of danger or illness by changing color, and believed to bring happiness and good fortune to all who have it. You can wear this turquoise bead on your neck, your wrist, your ankle, place it safely somewhere in your world, or give it as a loving gift to someone you think might also like to have it. Keep an eye out for Omnium Cookie treasures they hide in all Omnium products.

The following is an example of suitable text for describing the significances and perceived benefits of the "sun stone" carnelian. This sample text describes calming and motivational qualities in Tibetan cultural traditions.

> You have received an Omnium Cookie Treasure: Carnelian is a stone of protection and a favorite stone of the Tibetans. It is a sun stone with the ability to calm and relax and the ability to ease fears about death and rebirth. It has the power to bring the unconscious to the conscious and bring dreams as answers to one's questions. It brings to light personal talents, spurs motivation and increases self confidence. You can wear this carnelian bead on your neck, your wrist, your ankle, place it safely somewhere in your world, or give it as a loving gift to someone you think might also like to have it. Keep an eye out for Omnium Cookie treasures they hide in all Omnium products.

The following is an example of suitable text for describing red coral. This sample text describes red coral as a "healing stone," and explains perceived benefits of the stone, including courage, material success, and recovery from disease.

> You have received an Omnium Cookie Treasure: Red Coral is a healing stone and a favorite stone of the Tibetans. It is said to instill courage in its user. Coral is also believed to ensure material happiness and recovery from diseases. You can wear this coral bead on your neck, your wrist, your ankle, place it safely somewhere in your world, or give it as a loving gift to someone you think might also like to have it. Keep an eye out for Omnium Cookie treasures they hide in all Omnium products.

The following is an example of suitable text for describing lapis lazuli. This sample text explains historical significances ascribed to lapis lazuli in ancient cultures, including Egypt, Mesopotamia, Persia, Greece, and Rome, describes lapis lazuli as the stone of truth and friendship, and explains perceived benefits and significances of lapis lazuli in modern times, including harmony in friendships, and authenticity, openness, and candor.

> You have received an Omnium Cookie Treasure: Lapis Lazuli is a semi-precious gem which has a history stretching back to 5000 BC. Lapis was highly prized by the pharaohs of ancient Egypt and was popular among the people of Mesopotamia, Persia, Greece and Rome as well. Lapis Lazuli, meaning stone of azure, was known as sapphire in ancient times. Deep blue with flecks of gold pyrite, Lapis Lazuli, worn as jewelry, amulets and talismans as well made into carvings and adorning building and other objects. It was regarded as a holy stone and was thought to have magical powers. In the Middle Ages, it was thought to keep the limbs healthy, and free the soul from error, envy and fear. It is said to help cure depression, insomnia, recurring fevers, vision and hearing problems as well as disorders of the throat, lungs and immune system. Lapis Lazuli is regarded as the stone of friendship and truth by many people around the world today. Lapis is said to encourage harmony in relationships and help its wearer to be authentic, open, and candid.

The following is an example of suitable text for describing a silver bead. This sample text describes an example of a sterling silver bead with an engraving of a lotus flower, and describes sterling silver as a favorite object of the Tibetans.

> You have received an Omnium Cookie Treasure: Sterling Silver a favorite object of the Tibetans. It is used in making jewelry. If you look closely you can see the engraving of the sacred lotus flower drawn as two hearts and two oval shaped petals. You can wear this silver bead on your neck, your wrist, your ankle, place it safely somewhere in your world, or give it as a loving gift to someone you think might also like to have it. Keep an eye out for Omnium Cookie treasures they hide in all Omnium products.

Figure 8:
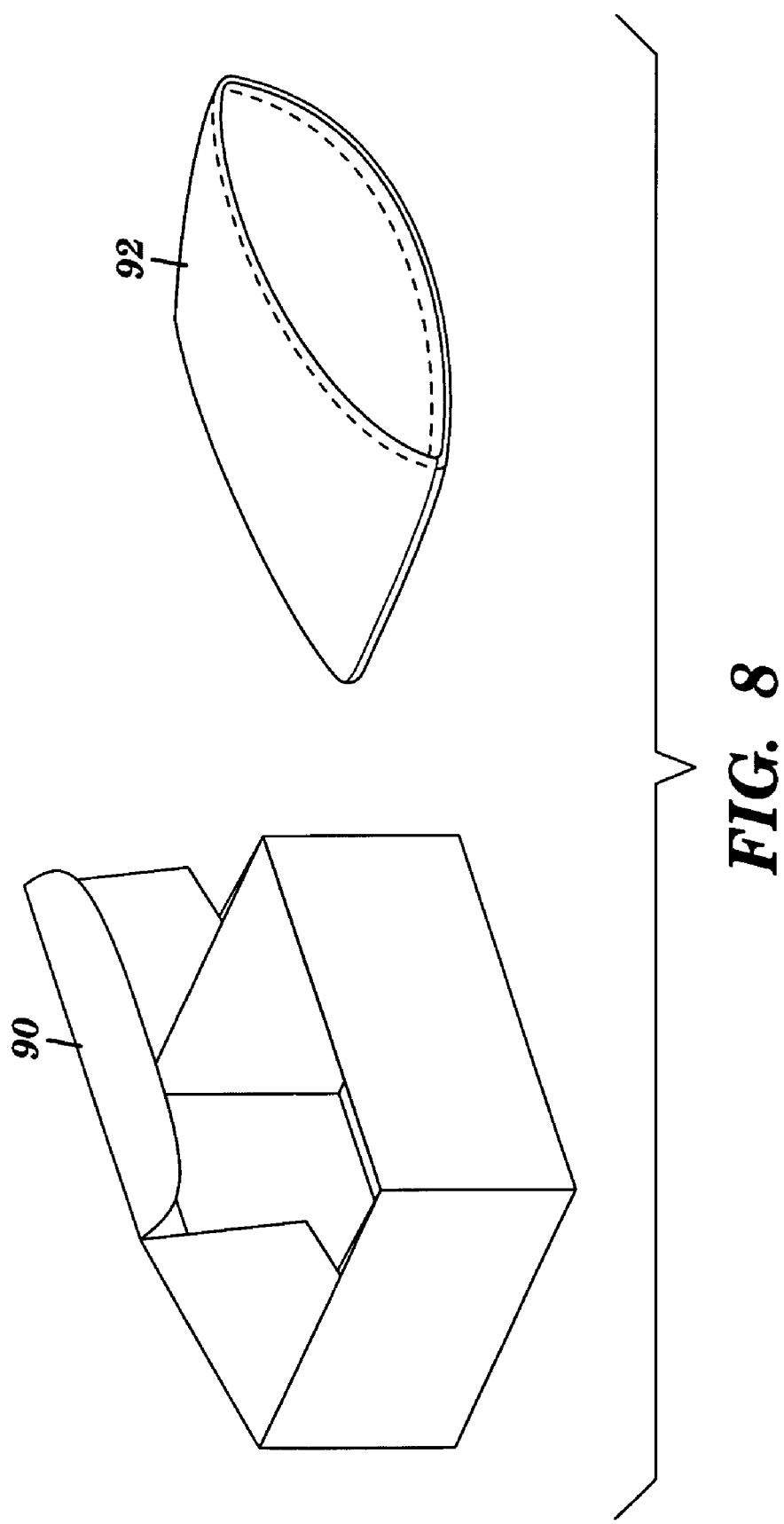
FIG. 8 is a perspective view of examples of an optional aspect of the embodiments of FIGS. 1 and 2.

The embodiments of FIGS. 1 and 2 may be enclosed in a container, for portability, storage, and marketing of the kit. Turning to FIG. 8, examples of containers for the kit include a box 90, and a resealable pouch 92.

Figure 9:
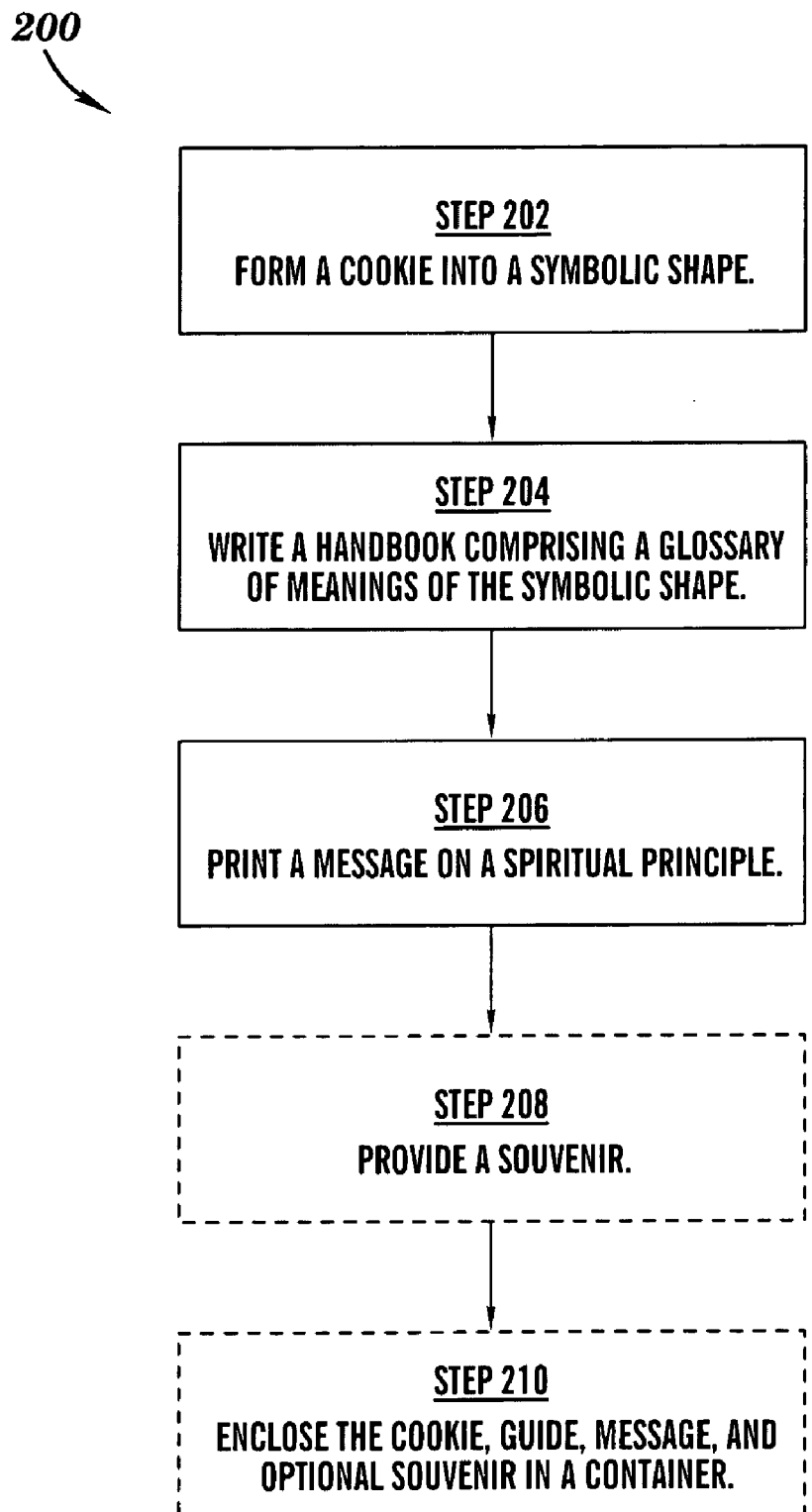
FIG. 9 is a chart of a method associated with the present invention.

Turning now to FIG. 9, a method 200 for manufacturing an embodiment of the invention is provided. In Step 202, a cookie is formed into a symbolic shape. In Step 204, a handbook is written. The handbook includes a glossary of meanings of the symbolic shape. In Step 206, a lesson on a spiritual principle is printed. In optional Step 208, a souvenir is provided. In optional Step 210, the cookie, handbook, lesson, and optional souvenir are enclosed in a container.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A multi-sensory teaching kit, comprising:
   a plurality of elements configured for teaching a user by the linked combination of taste, smell, touch, narrative, and use of fine motor skills;
   said plurality of elements including a plurality of edible elements configured in an assortment of at least three spiritually symbolic shapes selected from the group consisting of a flower, six petal lotus, deer, tree, Bodhi tree, lion, fish, water, dove, star, lily, heart, fire, and combinations thereof;
   said plurality of elements also including a plurality of non-edible souvenirs fabricated from a plurality of spiritually symbolic materials related to the shapes of the edible elements, selected from the group consisting of turquoise, carnelian, red coral, lapis lazuli, sterling silver, glass, wood, and combinations thereof;
   said plurality of non-edible souvenirs configured for being physically, manually, engaged with one another and with other non-edible souvenirs of others of said kits, to form a unified assembly;
   a written narrative on a substrate, configured to functionally link the shape of each of said edible elements, the material of said non-edible souvenirs, and the unified assembly;
   said edible elements including at least one edible cookie.

2. The kit of claim 1, being configured for use in a ceremony selected from the group consisting of spiritual ceremonies, prayer ceremonies, meditation ceremonies, and combinations thereof.

3. The kit of claim 1, wherein the symbolic shapes are selected from the group consisting of religious, cultural, and spiritual shapes.

4. The kit of claim 1, wherein said written narrative comprises a handbook selected from the group consisting of a printed pamphlet, printed sheets, a booklet, and combinations thereof.

5. The kit of claim 1, wherein said written narrative comprises a handbook including information on said edible elements selected from the group consisting of ingredients, production processes, storage instructions, significance of ingredients of said cookie, and combinations thereof.

6. The kit of claim 1, wherein said written narrative is disposed on a substrate selected from the group consisting of a paper strip, a textile ribbon, a plastic strip, and combinations thereof.

7. The kit of claim 1, wherein said souvenirs are configured to stimulate a user's sense selected from the group consisting of the senses of touch, smell, taste, sight, sound, and combinations thereof.

8. The kit of claim 1, wherein said souvenirs comprise beads configured for assembly with souvenirs of other kits, as part of a jewelry item.

9. The kit of claim 8, wherein said beads are comprised of materials selected from the group consisting of stone, semi-precious stone, metal, plastic, silver, glass, wood, incense and combinations thereof.

10. The kit of claim 1, wherein said written narrative comprises an explanation of a significance of said souvenirs.

11. The kit of claim 10, wherein said written narrative includes instructions for assembling said souvenirs into a jewelry item.

12. The kit of claim 1, further comprising a container configured to enclose components of the kit.

13. The kit of claim 12, wherein said container is selected from the group consisting of a box, a bag, a pouch, a resealable pouch, and combinations thereof.

14. The kit of claim 12, wherein said container is made from material selected from the group consisting of cardboard, plastic, and combinations thereof.

15. The kit of claim 1, wherein said edible elements are fabricated from ingredients selected from the group consisting of water, whole wheat flour, sugar, butter, baking powder, kosher salt, cinnamon, nutmeg, powdered sugar, and combinations thereof.

16. A method for manufacturing a multi-sensory teaching kit, comprising:
  (a) configuring a plurality of edible elements in an assortment of at least three spiritually symbolic shapes selected from the group consisting of a flower, six petal lotus, deer, tree, Bodhi tree, lion, fish, water, dove, star, lily, heart, fire, and combinations thereof;
  (b) selecting a plurality of materials related to said shapes;
  (c) configuring a plurality of non-edible souvenirs from said materials;
  (c) configuring the plurality of non-edible elements for being physically, manually engaged with one another to form a unified assembly;
  (d) generating and configuring a written narrative to include aspects of the edible elements and the non-edible souvenirs therein, to functionally link the shape of each of said edible elements, the material of said non-edible souvenirs, and the unified assembly;
  (e) printing the written narrative onto a substrate;
  (f) inserting the edible elements, the non-edible souvenirs, and the substrate into a container to form a kit;
  (g) instructing a user to recognize the shapes, recognize the materials, eat the edible elements, and manually engage the non-edible elements with one another to form a unified assembly; and
  (h) instructing a user to manually engage the non-edible souvenirs of said kit with non-edible souvenirs obtained from other of said kits to form an other unified assembly, wherein a kit is provided which is configured for teaching a user by the linked combination of taste, smell, touch, narrative, and use of fine motor skills.

17. The method of claim 16, further comprising configuring the non-edible souvenir to be culturally significant.

18. The method of claim 17, wherein said selecting (b) further comprises selecting said materials from the group consisting of turquoise, carnelian, red coral, lapis lazuli, sterling silver, glass, wood, and combinations thereof.

19. The method of claim 17, wherein said configuring (c) further comprises configuring the plurality of non-edible elements in the form of beads.

20. A method for multi-sensory education, comprising:
  (a) providing a plurality of the kits of claim 2;
  (b) opening one of said kits to display the edible elements, the non-edible souvenirs, and the substrate having the written narrative thereon;
  (c) reading the written narrative;
  (d) physically engaging the non-edible souvenirs to one another to transform the souvenirs into a unified assembly;
  (e) repeating said steps (b)-(d) for other ones of said plurality of kits; and
  (f) physically engaging the non-edible souvenirs of said plurality of kits with one another to transform the souvenirs into an other unified assembly, wherein the user is taught by the linked combination of taste, smell, touch, narrative, and use of fine motor skills.

* * * * *

UNITED STATES PATENT AND TRADEMARK OFFICE
CERTIFICATE OF CORRECTION

| | | |
|---|---|---|
| PATENT NO. | : 7,959,442 B2 | |
| APPLICATION NO. | : 11/950785 | |
| DATED | : June 14, 2011 | |
| INVENTOR(S) | : Nichols | |

It is certified that error appears in the above-identified patent and that said Letters Patent is hereby corrected as shown below:

Column 13, Line 16, 7th word "shape", should read --shapes--.

Column 13, Line 28, 2nd word "other", should read --others--.

Column 14, Line 13, 9th/10th word/number, "Claim 2", should read --Claim 1--.

Column 14, After Line 17, please insert --(c) consuming at least one of the edible elements;--.

Signed and Sealed this
Tenth Day of January, 2012

David J. Kappos
*Director of the United States Patent and Trademark Office*